United States Patent
Bourne et al.

(10) Patent No.: US 7,152,243 B2
(45) Date of Patent: Dec. 19, 2006

(54) PROVIDING A SECURE HARDWARE IDENTIFIER (HWID) FOR USE IN CONNECTION WITH DIGITAL RIGHTS MANAGEMENT (DRM) SYSTEM

(75) Inventors: Steven Bourne, Seattle, WA (US); Vinay Krishnaswamy, Woodinville, WA (US); Michael P. Calligaro, Redmond, WA (US); Randal Ramig, Seattle, WA (US); David Brian Wecker, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 943 days.

(21) Appl. No.: 10/185,660

(22) Filed: Jun. 27, 2002

(65) Prior Publication Data

US 2004/0003271 A1 Jan. 1, 2004

(51) Int. Cl.
G06F 7/04 (2006.01)
G06F 17/30 (2006.01)
G06K 9/00 (2006.01)
H04L 9/00 (2006.01)

(52) U.S. Cl. .......................... 726/26; 713/176
(58) Field of Classification Search ............. 726/26
See application file for complete search history.

(56) References Cited

U.S. PATENT DOCUMENTS

| | | | | |
|---|---|---|---|---|
| 5,421,006 | A |  5/1995 | Jablon et al. ............. 395/575 |
| 5,715,403 | A |  2/1998 | Stefik ....................... 395/244 |
| 5,964,873 | A * | 10/1999 | Choi ............................ 713/2 |
| 6,149,522 | A * | 11/2000 | Alcorn et al. ............... 463/29 |
| 6,327,652 | B1 | 12/2001 | England et al. ............. 713/2 |
| 6,418,472 | B1 * | 7/2002 | Mi et al. .................... 709/229 |
| 2001/0037323 | A1 * | 11/2001 | Moulton et al. ............. 707/1 |
| 2002/0174356 | A1 * | 11/2002 | Padole et al. .............. 726/26 |
| 2003/0097581 | A1 | 5/2003 | Zimmer .................... 713/200 |

FOREIGN PATENT DOCUMENTS

| | | |
|---|---|---|
| WO | WO 98/42098 | 9/1998 |
| WO | WO 00/21239 | 4/2000 |
| WO | WO 00/58811 | 10/2000 |
| WO | WO 00/59150 | 10/2000 |
| WO | WO 01/52021 | 7/2001 |

OTHER PUBLICATIONS

"Digital Rights Management for Audio Drivers", *White Paper from Microsoft*, Dec. 04, 2001, 1-3, XP-002303668, http://microsoft.com/whdc/archive.

Hollingworth, D. et al., "Security Policy Realization in an Extensible Operating System", *Information Survivability Conference and Exposition*, 2000, 330-334, XP 0110371152.

Beese, L.J. "Security Strategy for Networked Computers",*Proceedings of the 1987 Carnahan Conference on Security Technology:Electronic Crime Countermeasures*, 1987, 141-147.

(Continued)

*Primary Examiner*—Gilberto Barron, Jr.
*Assistant Examiner*—Christopher J. Brown
(74) *Attorney, Agent, or Firm*—Woodcock Washburn LLP

(57) ABSTRACT

A trusted component on a device includes a secure HWID therein and is verified by obtaining a key from the device, and verifying each signed component of the operating system of the device therewith. A driver table is examined to locate a HWID driver which is verified as containing a pointer back to an address inside a kernel. The verified operating system is called to obtain the secure HWID from a HWID component by way of the HWID driver and to return same to the trusted component. Thereafter, the returned HWID is verified as matching the HWID included with the trusted component.

17 Claims, 6 Drawing Sheets

OTHER PUBLICATIONS

Devanbu, P. et al., "Research Directions for Automated Software Verification; Using Trusted Hardware", *Proceedings. 12th IEEE International Conference Automated Software Engineering*(Cat. No.97TB100200), 1997, 274-279.

Griswold, G.N., "A Method for Protecting Copyright on Networks",*IMA Intellectual Property Project Proceedings*, 1994, 1(1), 169-178.

Kahn, R.E., "Deposit, Registration, and Recordation in an Electronic Copyright Management System", *IMA Intellectual Property Project Proceedings*, 1994, 1(1), 111-120.

Lindqvist, U. et al., "An Analysis of a Secure System Based on Trusted Components", *COMPASS '96. Proceedings of the Eleventh Annual Conference on Computer Assurance. Systems Integrity. Software Safety. Process Security*(Cat. No. 96CH35960), 1996, 213-223.

Smith, S.W. et al., "Trusting Trusted Hardware: Towards a Formal Model for Programmable Secure Coprocessors", *Proceedings of the 3rd USENIX Workshop on Electronic Commerce*, 1998, 83-98.

Weinberg, J. "Hardware-based ID, rights management, and trusted systems", *Journal*, 2000, 52(5), 1251-1281.

* cited by examiner

PROVIDING A SECURE HARDWARE IDENTIFIER (HWID) FOR USE IN CONNECTION WITH DIGITAL RIGHTS MANAGEMENT (DRM) SYSTEM

TECHNICAL FIELD

The present invention relates to a system such as a digital rights management (DRM) system for enforcing rights in digital content. More specifically, the present invention relates to such an enforcement system that allows access to encrypted digital content only in accordance with parameters specified by license rights acquired by a user of the digital content. Even more specifically, the present invention relates to providing a device with a secure hardware identifier (HWID) for use with such an enforcement system whereby the system can bind to the HWID.

BACKGROUND OF THE INVENTION

As is known, and referring now to FIG. 1, digital rights management (DRM) and enforcement system is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer 14 or the like.

Typically, a content owner distributing such digital content 12 wishes to restrict what the user can do with such distributed digital content 12. For example, the content owner may wish to restrict the user from copying and redistributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. A DRM system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (i.e., (KD(CONTENT))), as well as other information identifying the content, how to acquire a license for such content, etc.

The trust-based DRM system 10 allows an owner of digital content 12 to specify license rules that must be satisfied before such digital content 12 is allowed to be rendered on a user's computing device 14. Such license rules can include the aforementioned temporal requirement, and may be embodied within a digital license 16 that the user/user's computing device 14 (hereinafter, such terms are interchangeable unless circumstances require otherwise) must obtain from the content owner or an agent thereof. Such license 16 also includes the decryption key (KD) for decrypting the digital content, perhaps encrypted according to a key decryptable by the user's computing device.

The content owner for a piece of digital content 12 must trust that the user's computing device 14 will abide by the rules and requirements specified by such content owner in the license 16, i.e. that the digital content 12 will not be rendered unless the rules and requirements within the license 16 are satisfied. Preferably, then, the user's computing device 14 is provided with a trusted component or mechanism 18 that will not render the digital content 12 except according to the license rules embodied in the license 16 associated with the digital content 12 and obtained by the user.

The trusted component 18 typically has a license evaluator 20 that determines whether the license 16 is valid, reviews the license rules and requirements in such valid license 16, and determines based on the reviewed license rules and requirements whether the requesting user has the right to render the requested digital content 12 in the manner sought, among other things. As should be understood, the license evaluator 20 is trusted in the DRM system 10 to carry out the wishes of the owner of the digital content 12 according to the rules and requirements in the license 16, and the user should not be able to easily alter such trusted element for any purpose, nefarious or otherwise.

As should be understood, the rules and requirements in the license 16 can specify whether the user has rights to render the digital content 12 based on any of several factors, including who the user is, where the user is located, what type of computing device the user is using, what rendering application is calling the DRM system, the date, the time, etc. In addition, the rules and requirements of the license 16 may limit the license 16 to a pre-determined number of plays, or pre-determined play time, for example.

The rules and requirements may be specified in the license 16 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the license evaluator 20 determining that the license 16 is valid and that the user satisfies the rules and requirements therein, the digital content 12 can then be rendered. In particular, to render the content 12, the decryption key (KD) is obtained from the license 12 and is applied to (KD (CONTENT)) from the content package 13 to result in the actual content 12, and the actual content 12 is then in fact rendered.

In a DRM system 10, content 12 is packaged for use by a user by encrypting such content 12 and associating a license 16 having a set of rules with the content 12, whereby the content 12 can be rendered only in accordance with the rules in the license 16. Because the content 12 requires the license 16 for access thereto, then, the content 12 may be freely distributed. Significantly, the license 16 must somehow be bound either directly or indirectly to a computing device 14 on which the content 12 is to be rendered. Otherwise, the license 12 could potentially be copied to an infinite number of other devices 14 and rendered thereon, also.

Binding a license 16 to a device 14 is known or should be apparent to the relevant public and therefore need not be set forth herein in any detail. If directly bound, the license 16 may include an identifier of the device 14 therein and may require confirmation that the device 14 is indeed the device 14 identified in the license. If directly bound, the license 16 may include an encrypted decryption key decipherable only by a hardware or software construct on the device 14 (i.e., the trusted component 18), the construct may include the identifier of the device 14 therein, and the license 16 and/or construct may require confirmation that the device 14 is indeed the device 14 identified in the construct.

Typically, the license 16 is bound to a computing device 14 by way of a unique hardware identifier (HWID) incumbent in the device 14 and not easily transferable to any other device 14. Such HWID may be a physical HWID permanently inscribed into the device 14 and electronically obtainable from the device 14, or may be calculated from a number of values electronically present in the device 14, such as for example a serial number of a hard drive, a serial number of a memory, a serial number of a processor, etc. Calculating an HWID based on values incumbent in a device 14 is known or should be apparent to the relevant public and therefore need not be described herein in any detail. Significantly, trusted component 18 typically calculates the HWID from values present in the device 14, and such values are computer-readable and assumed to be trustworthy enough from a hardware point of view that a nefarious entity could not change or misrepresent the values in an effort to subvert the DRM system 10. That is, the hardware in the device 14 must be assumed to be trustworthy enough to prevent the changing or misrepresenting of the values.

However, it may be the case that it cannot in fact be assumed that the values in a device 14 are indeed trustworthy such that a HWID based on such values can be considered secure. That is, it may be the case that the hardware in the device 14 is not capable of being trusted to protect the values. For example, the hardware may not have any appropriate values, or the hardware may have appropriate values, but not in a computer-readable and secure form, or the hardware can be manipulated to give out an incorrect value, among other things. Such non-trustworthy hardware and values may especially be present in a relatively simple device 14, such as for example a portable music player or a portable data assistant. As may be appreciated, in such simple devices 14, there may be very little hardware to speak of, such hardware may not include computer-readable identifiers capable of acting as identifying values, the hardware may not be capable of communicating an identifier to the operating system, and/or the device 14 and the hardware thereof may not have the functionality necessary to divulge any such values, among other things. Of course, it may also be the case that other more complex devices 14 may also not have the trustworthy hardware and values necessary to impart a secure HWID to the device 14.

A need exists, then, for a method and mechanism to impart a secure HWID to a device 14 in the case where the hardware is not trusted to provide a secure HWID. Particularly, a need exists for a method and mechanism that allow a manufacturer of the device 14 to impart a secure HWID to a device 14 that can be obtained by the operating system of the device 14. Even more particular, a need exists for software on a device 14 as provided by the manufacturer that can be trusted to impart a secure HWID to the device 14 and to divulge such secure HWID to the operating system of such device 14, where the secure HWID cannot easily be changed or misrepresented by a nefarious entity.

SUMMARY OF THE INVENTION

The aforementioned needs are satisfied at least in part by the present invention in which a computing device is manufactured to ensure that the device can access a secure hardware identifier (HWID) thereon. The computing device is for receiving a piece of digital content and a digital license therefor and for rendering the content in accordance with the license, and the license is bound to the secure HWID such that the license is inoperative on another device having a different secure HWID.

A public key (PU-OEM) is received from a certifying authority with a signature from the certifying authority, and (PU-OEM) with the signature is placed in a memory of the device. An operating system for the device is received, where the operating system has multiple individual components including an executable kernel, a plurality of drivers, and a driver table with a pointer to each driver. Each of at least some of the individual components is accompanied by a signature based on the component.

The device is supplied with a HWID component for obtaining the secure HWID from the device and forwarding the secure HWID to the operating system of the device upon the operating system requesting same, and a HWID driver is placed in the memory as an addition to the operating system. The HWID driver communicates with the HWID component to obtain and forward the secure HWID.

A reference to the HWID driver is placed in the driver table, and for each signed component of the operating system, the signature of the component is verified and removed. The component is then signed with a private key (PR-OEM) corresponding to (PU-OEM). All of the components of the operating system, including the components with the (PR-OEM) signature, are then placed into the memory.

A trusted component is obtained for the device from a trusted component authority, and is constructed to include the secure HWID therein in a secure manner. The trusted component is verified by obtaining (PU-OEM) with the signature thereof and verifying the signature. Each signed component of the operating system is also verified by verifying the signature thereof based on the obtained (PU-OEM), the driver table is examined to locate the HWID driver, and the HWID driver is verified as containing a pointer back to an address inside the kernel.

If the HWID driver and the operating system verify, the operating system is called to obtain the secure HWID from the HWID component and return same to the trusted component. The kernel receives the call and re-directs same to the HWID driver by way of the driver table, and the HWID driver obtains the secure HWID by way of the HWID component and returns same to the trusted component. Thereafter, it is verified that the returned HWID matches the HWID included in the trusted component.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
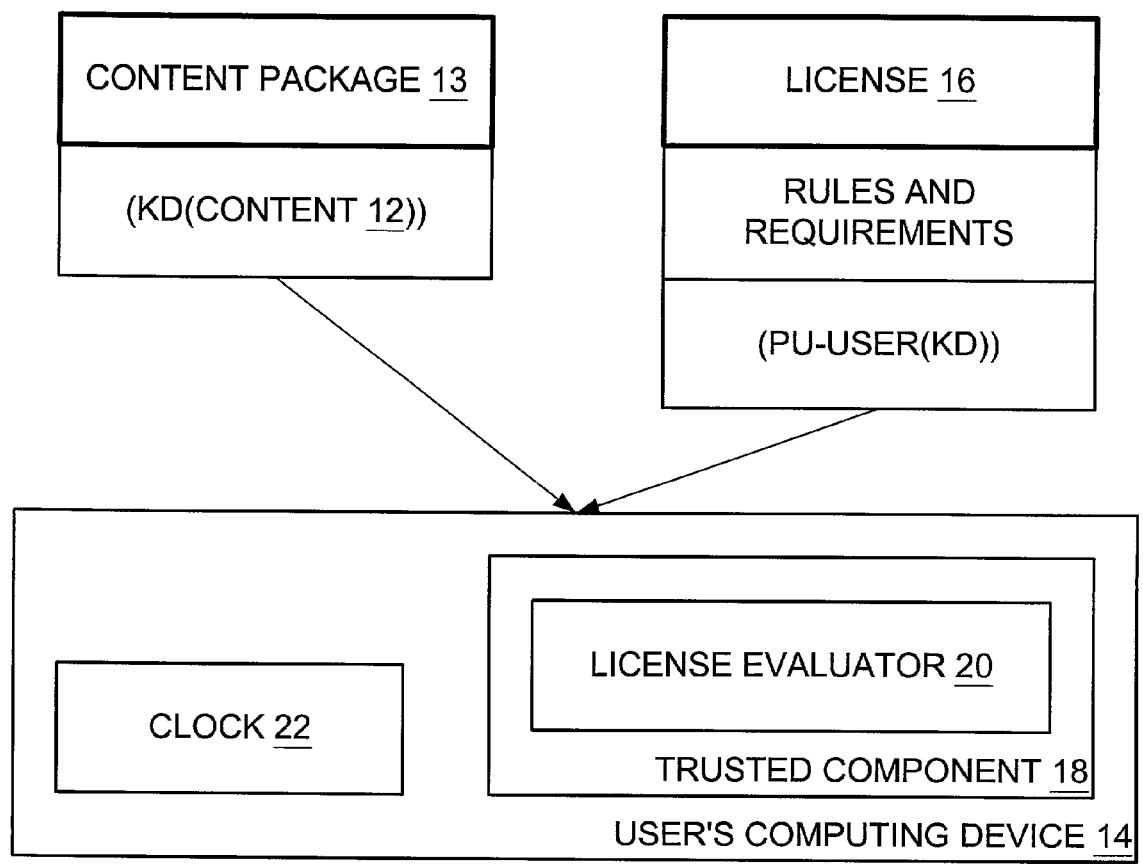
FIG. 1 is a block diagram showing an enforcement architecture of an example of a trust-based system.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

Figure 2:
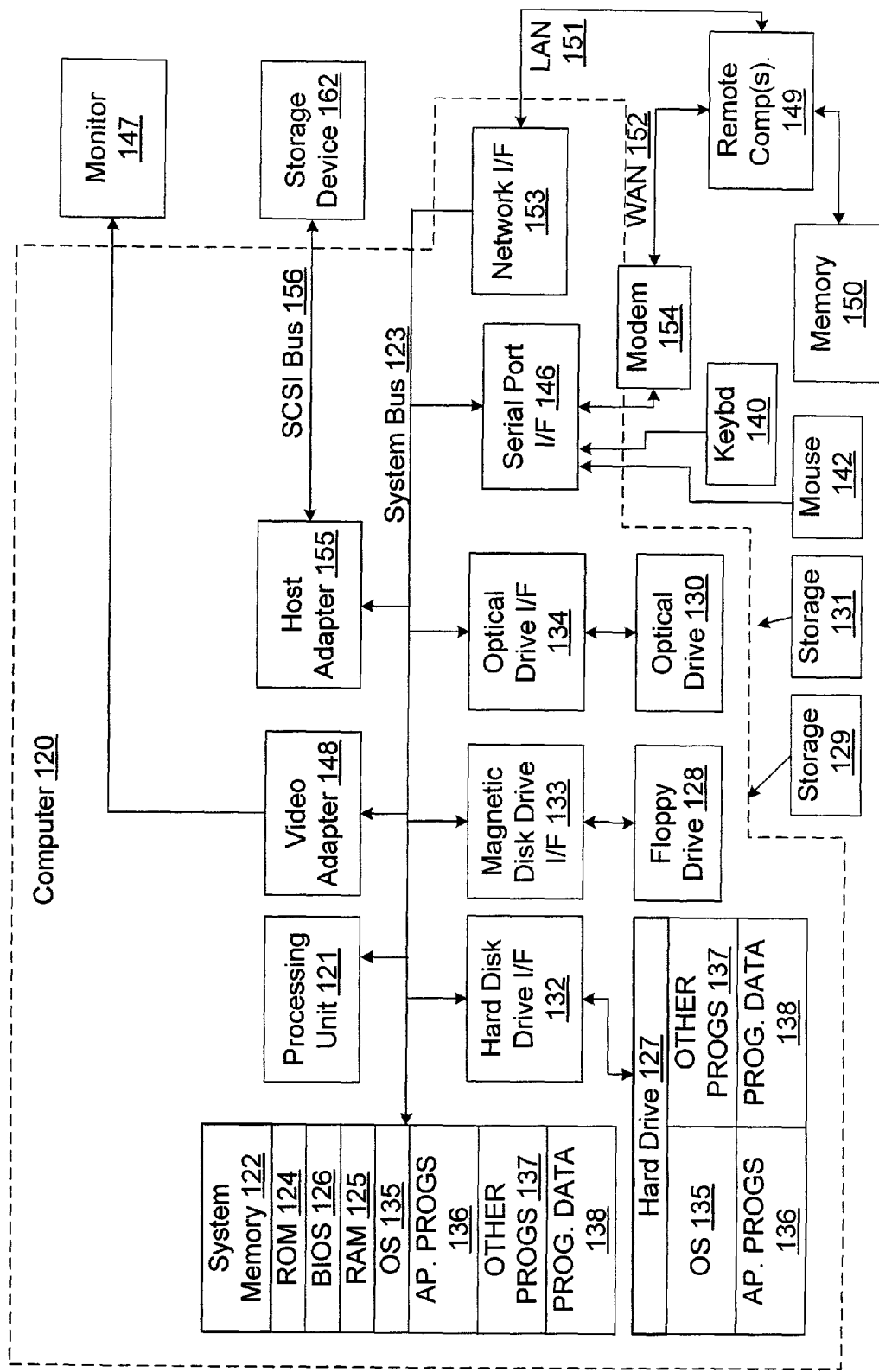
FIG. 2 is a block diagram representing a general purpose computer system in which aspects of the present invention and/or portions thereof may be incorporated.

As shown in FIG. 2, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 20.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 2 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 2. The logical connections depicted in FIG. 2 include a local area network (LAN) 151 and a wide area network (WAN) 152. Such networking environments are commonplace in offices, enterprise-wide computer networks, intranets, and the Internet. The personal computer 120 may also act as a host to a guest such as another personal computer 120, a more specialized device such as a portable player or portable data assistant, or the like, whereby the host downloads data to and/or uploads data from the guest, among other things.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Secure Hardware Identifier (HWID)

A secure HWID individualizes a device 14 and allows a trusted component 18 on the device 14 to verify that it is indeed intended for the device 14. That is, the secure HWID is employed to bind the trusted component 14 to the device 12, and a license 16 bound to the trusted component 14 is by extension bound to the device 14 and authorizes content 12 to be rendered on the device 14. Accordingly, content 12 can be securely rendered on a device 14 with a non-secure operating system. In some devices 14, however, the operating system of the device 14 cannot of itself retrieve a secure HWID from the device 14 based on one or more values incumbent in the device 14.

Figure 3:
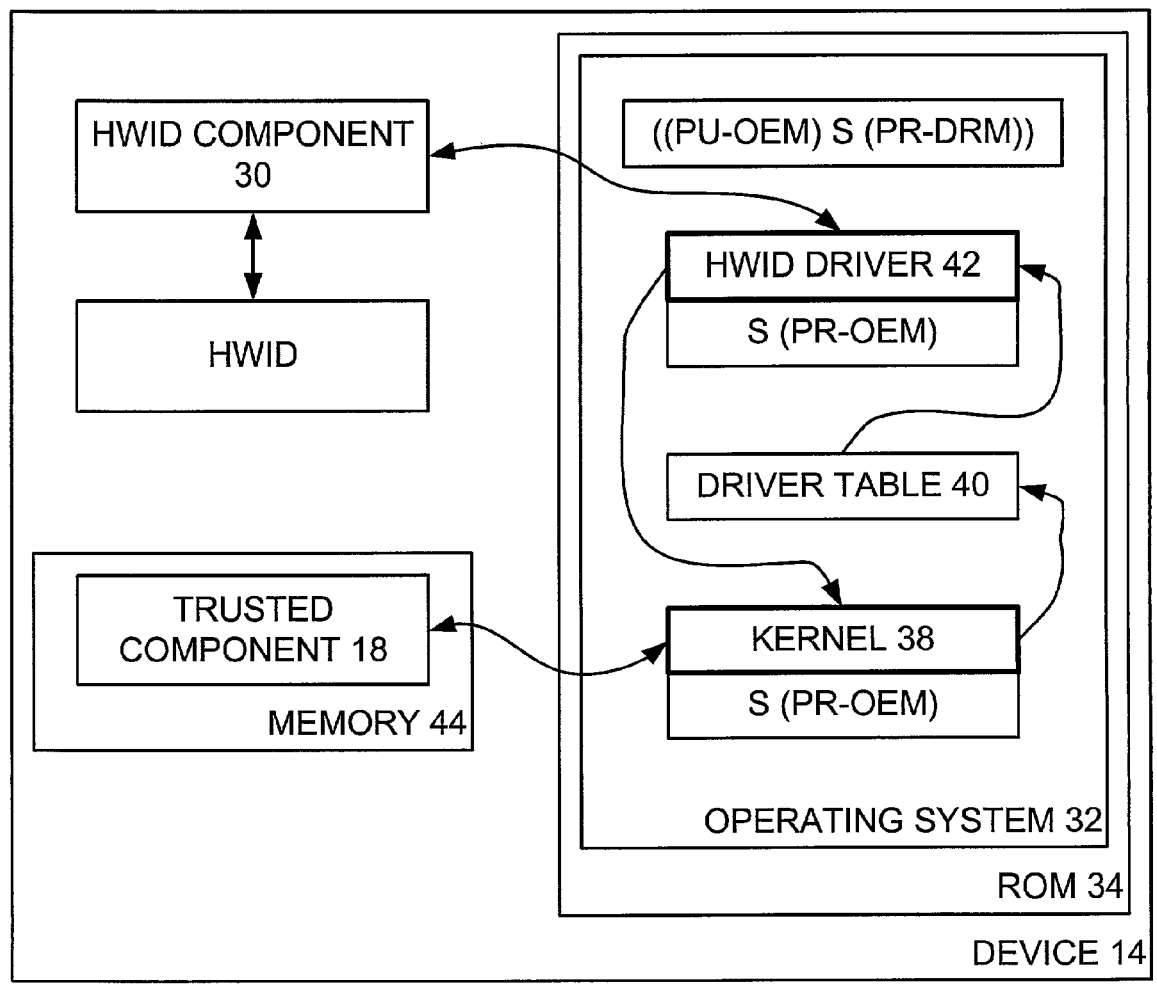
FIG. 3 is a block diagram showing a computing device having a trusted component, operating system, and hardware identifier (HWID) component for obtaining a secure HWID for the device in accordance with one embodiment of the present invention.

Accordingly, in one embodiment of the present invention, and turning now to FIG. 3, the device 14 is manufactured by a manufacturer that supplies the device 14 with a HWID component 30 that retrieves a secure HWID from the device 14 and forwards such secure HWID to the operating system 32 of the device 14 upon such operating system 32 requesting same. Presumably, the secure HWID is required either as part of binding a license 16 to the device 14 or verifying that a license 16 is in fact bound to the device 14, although the secure HWID could be required for any other purpose without departing from the spirit and scope of the present invention.

The HWID component 30 may be any appropriate component without departing from the spirit and scope of the present invention. For example, the HWID component 30 may be a piece of software or may be hardware. In addition, the HWID component 30 may contain the secure HWID or may obtain the secure HWID from elsewhere without departing from the spirit and scope of the present invention. For example, the secure HWID may be resident within the HWID component 30 or may be remote therefrom but obtainable thereby. The secure HWID may be stored in any appropriate location without departing from the spirit and scope of the present invention. For example, the secure HWID may be physically stored in a piece of hardware or may only be part of a piece of software. Generally, securely storing the HWID and employing a HWID component 30 to securely obtain the HWID are known or should be apparent to the relevant public and therefore need not be described herein in any detail. Significantly, the manufacturer may implement the secure HWID in any fashion without departing from the spirit and scope of the present invention as long as the implemented HWID is indeed secure, and is not easily susceptible to change or misrepresentation by a nefarious entity.

In one embodiment of the present invention, the HWID component 30 is registered with the operating system 32, and is called by same when an application 34 requests the secure HWID. As part of securing the HWID and imparting trustworthiness thereto, both the manufacturer-supplied HWID component 30 and each calling component of the operating system 32 are digitally signed to produce respective digital signatures, and such signatures are verified as part of the calling process to ensure that the components have not been tampered with or replaced.

Figure 4:
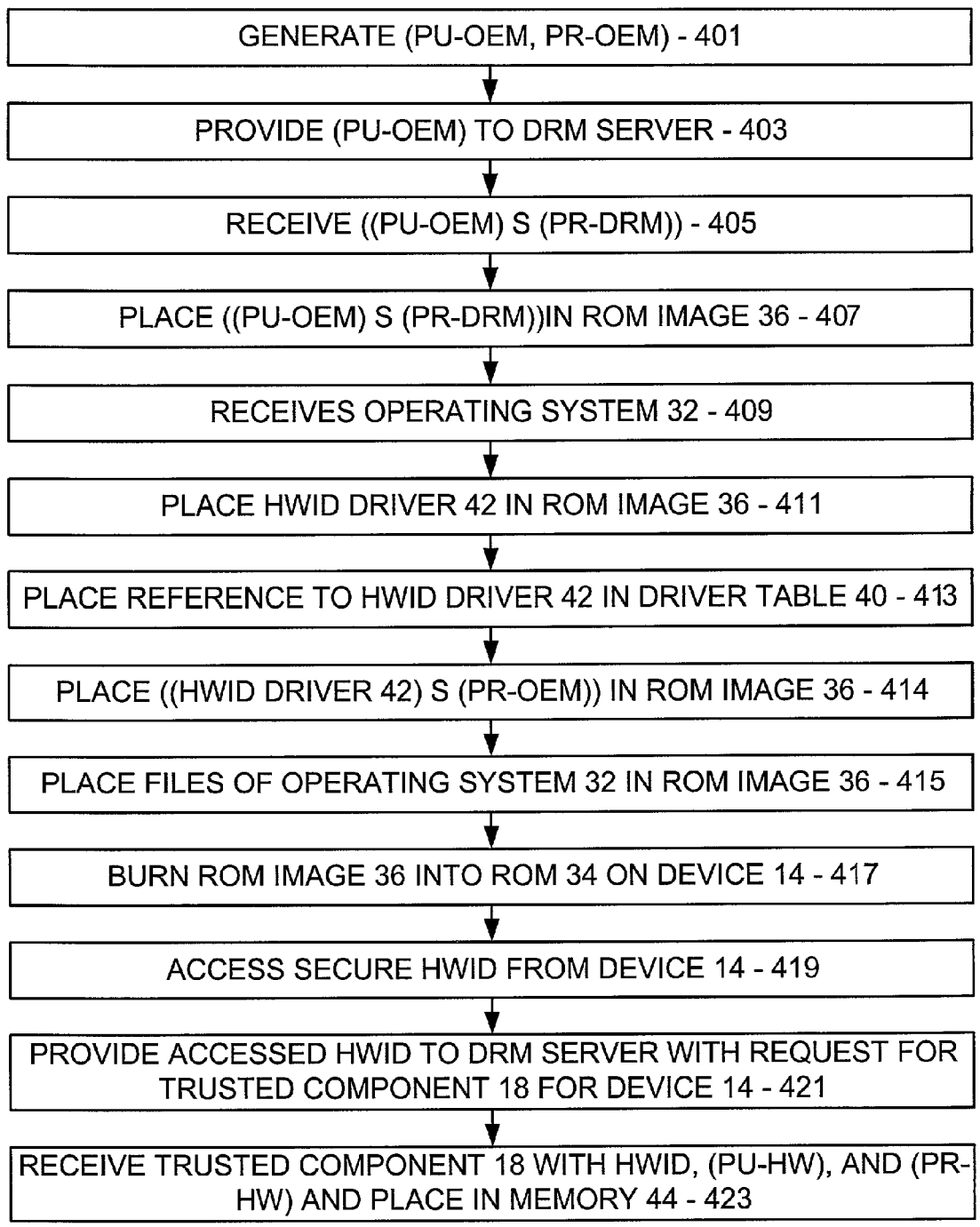
FIGS. 4 and 4A are flow diagrams showing key steps performed in placing the trusted component, operating system, and hardware identifier (HWID) component on the device of FIG. 3 in accordance with one embodiment of the present invention.
Figure 5:
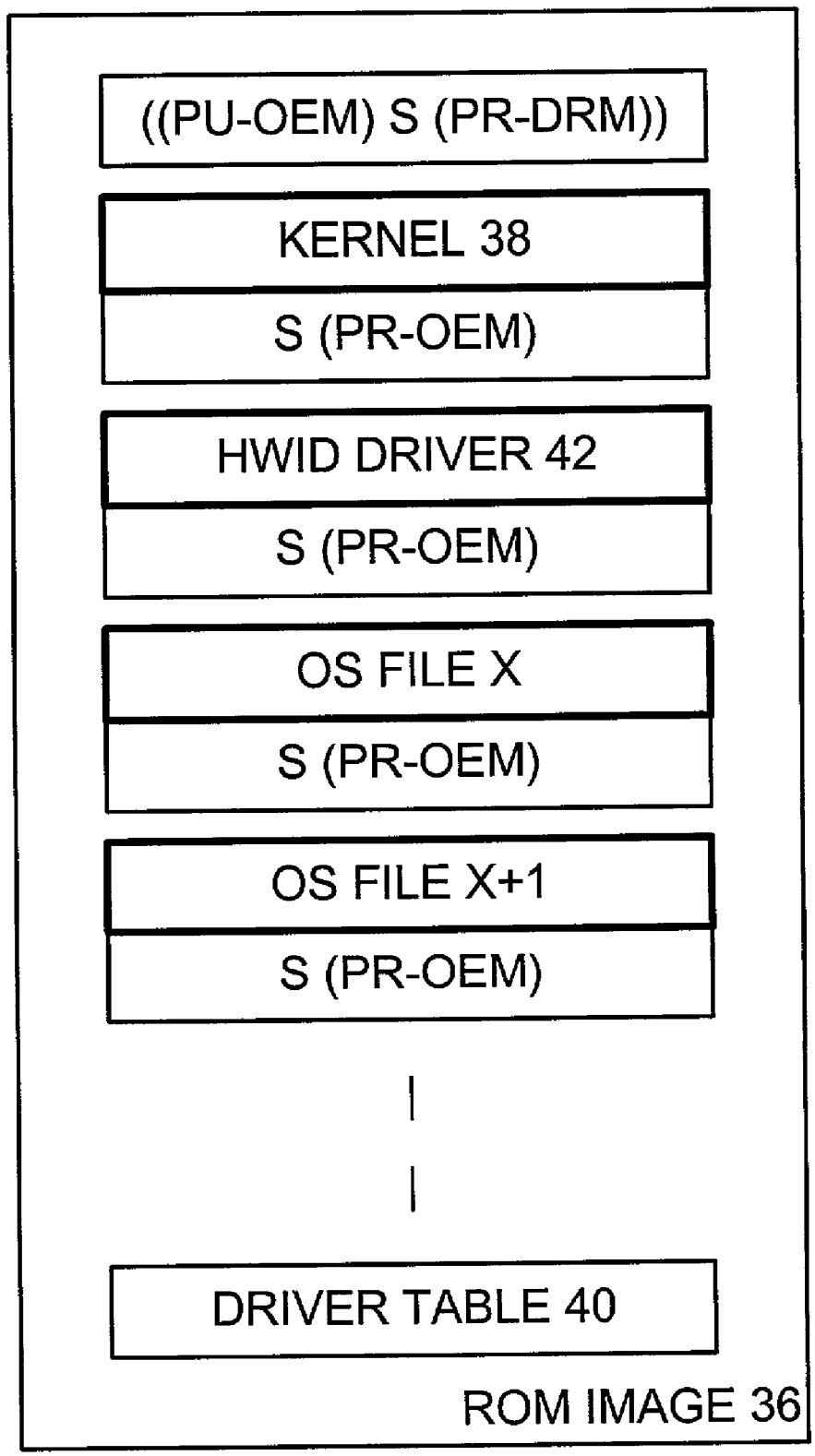
FIG. 5 is a block diagram of a ROM image created in connection with the steps of FIGS. 4 and 4A.

In one embodiment of the present invention, the operating system 32 or at least a relevant portion thereof is resident on the device 14 in a ROM (read-only memory) 34 thereon and instantiated therefrom, and the operating system 32 is placed on the ROM 34 by or at the behest of the manufacturer of the device 14 according to a method of the present invention in order to ensure that the operating system 32 can access a secure HWID by way of the HWID component 30. With reference to FIG. 4, such a method is as follows:

Preliminarily, the manufacturer or an agent thereof (hereinafter, 'the manufacturer') generates an asynchronous public-private manufacturer key pair (PU-OEM, PR-OEM) (step 401), and provides (PU-OEM) to a DRM server (not shown) (step 403). As may be appreciated, the DRM server is a central authority that certifies that the manufacturer may in fact include the device 14 in the DRM system 10, and signifies the certification by returning (PU-OEM) to the manufacturer signed by a private key of the DRM server (PR-DRM) to result in ((PU-OEM) S (PR-DRM)). The manufacturer receives ((PU-OEM) S (PR-DRM)) (step 405) and places same in a ROM image 36, as seen in FIG. 5 (step 407).

Typically, the manufacturer receives the actual operating system 32 from an external source (step 409) and incorporates same into the device 14. In one embodiment of the present invention, the operating system 32 as received comprises multiple individual files, and each relevant file of the operating system 32 is accompanied by a signature based on the file. As may be appreciated, each relevant file may comprise every file, or may be a select subset of every file, such as executable files, executable files relevant to DRM processes, all files relevant to DRM processes, combinations thereof, and the like.

As seen in FIG. 3, one of the files in the operating system 32 is typically a kernel executable file 38. As should be appreciated, the kernel 38 within the operating system 32 provides core functionalities. Typically, the kernel 38 initiates a function by calling a driver in the operating system 32 to perform the function, and the kernel 38 has access to a driver table 40 that includes a pointer to each driver. Most relevant to the present invention, the operating system 32 on the device 14 includes a HWID driver 42 that communicates with the HWID component 30 to obtain the secure HWID. Notably, the HWID driver 42 is specific to the HWID component 30, the HWID component 30 is provided by the manufacturer, and therefore the HWID driver 42 is also provided by the manufacturer. In particular, the manufacturer provides the HWID driver 42 by placing same in the ROM image 36 (step 411), and places a reference to the HWID driver 42 in the driver table 40 (step 413). The manufacturer may also sign the HWID driver 42 with (PR-OEM) and place the signature in the ROM image 36 (step 414).

Figure 4A:
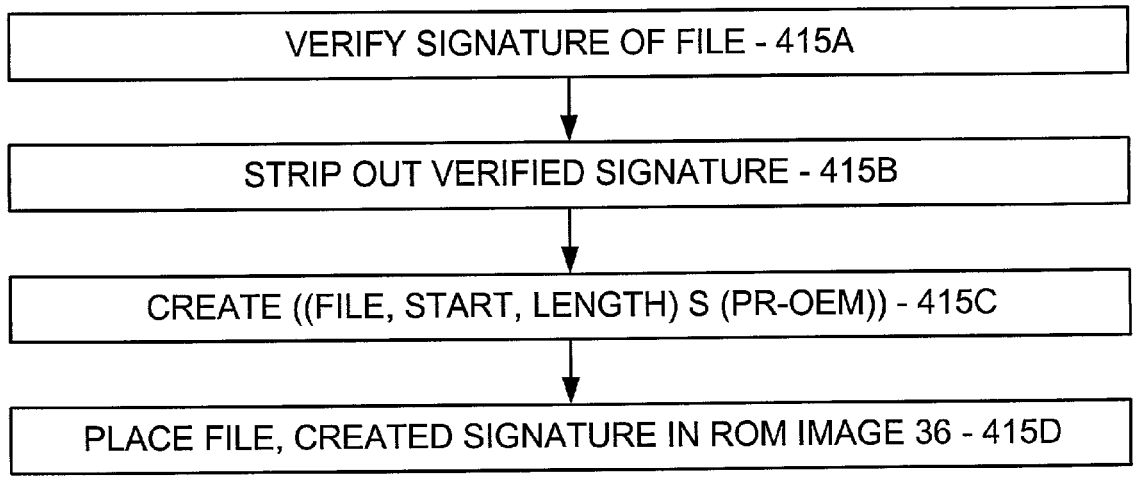

The manufacturer also takes the files of the operating system 32 as provided and places such files into the ROM image 36 (step 415) for each signed file, and referring now to FIG. 4A, the manufacturer verifies the signature thereof (step 415A), strips out the signature (step 415B), creates a new signature therefor with (PR-OEM) (step 415C), and places the file with the new signature therefor in the ROM image 36 (step 415D). In one embodiment of the present invention, each signature is based not only on the file but on the base address and length of the file in the ROM image 36 to result in ((file, start, length) S (PR-OEM)).

With the operating system 32 as embodied in the ROM image 36 as shown in FIG. 5, and perhaps with other information, the manufacturer places such operating system 32 on the device 14 by burning the ROM image 36 into the ROM 34 on such device 14 (step 417). In addition, the manufacturer obtains a trusted component 18 for the device 14 from a DRM trusted component server (not shown). As may be appreciated, the DRM trusted component server is a central authority that provides trusted components 18 and ensures that each trusted component 18 is bound to a device 14.

In particular, the manufacturer accesses the secure HWID from the device 14 (step 419), and provides the accessed HWID to the server as part of a request for a trusted component 18 for the device 14 (step 421). The server constructs the trusted component 18 to include the provided HWID therein, and also to include therein a public-private key pair to be associated with the device 14 (PU-HW, PR-HW). As may be appreciated, HWID and (PR-HW) are embedded in the trusted component 18 in a highly secure manner so that such items cannot be altered without great difficulty, but can be found by the trusted component 18 itself. The manufacturer then receives the trusted component 18 with HWID, (PU-HW), and (PR-HW), and places the received trusted component 18 in a memory 44 of the device (step 423). Note that the trusted component 18 may be updated on occasion, in which case the memory 44 is a non-volatile re-writable memory 44. Of course, the trusted component 18 should be protected against alteration by a nefarious entity, and therefore should at a minimum include a verifying signature, and perhaps other security measures. Note that in an alternate embodiment of the invention, an end user of the device 14 obtains the trusted component 18 therefor.

With the secure HWID, the HWID component 30, the operating system 32 in the ROM 34, and the trusted component 18 in the memory 44, the device 14 in operation accesses the secure HWID thereon by verifying the operating system 32 and then making a call to the HWID driver 42 to obtain the secure HWID from the HWID component 30. Again, the secure HWID is presumably required either as part of binding a license 16 to the device 14 or verifying that a license 16 is in fact bound to the device 14, although the secure HWID could be required for any other purpose without departing from the spirit and scope of the present invention. As should be appreciated, verifying the operating system 32 imparts trust to the HWID driver 42, and provides assurance that the HWID returned thereby is valid and correct.

Figure 6:
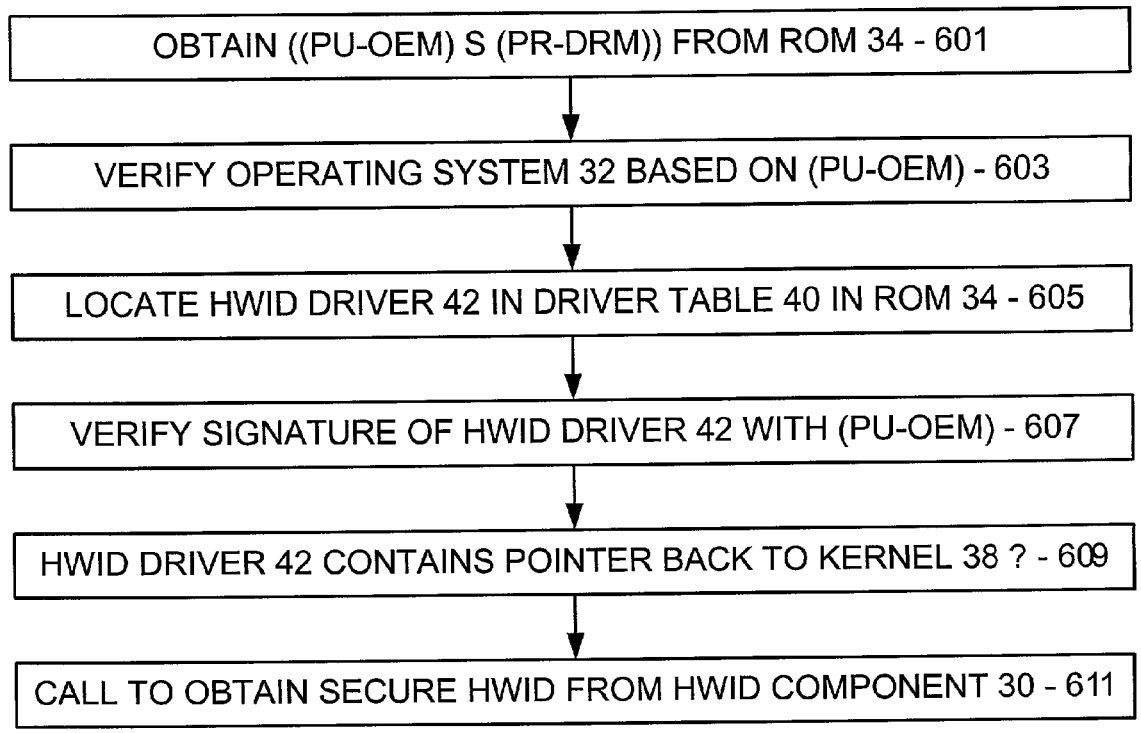
FIG. 6 is a flow diagram showing key steps performed by the trusted component of FIG. 3 to obtain the secure HWID of the device of FIG. 3 in accordance with one embodiment of the present invention.

The secure HWID is typically accessed upon the request of the trusted component 18, although other requesters may be employed without departing from the spirit and scope of the present invention. In one embodiment of the present invention, and referring now to FIG. 6, the secure HWID is accessed in the following manner:

Preliminarily, the trusted component 18 obtains ((PU-OEM) S (PR-DRM)) from the ROM memory 34 (step 601), verifies the signature, and verifies the operating system 32 based on such obtained (PU-OEM) (step 603). In particular, for each signed file of the operating system 32, the signature thereof which is based on (PR-OEM), the trusted component 18 verifies the signature based on the obtained (PU-OEM), and based on the attributes and/or elements of the file employed to create the signature (i.e., the file itself and the base address and length of the file in ROM memory 34).

If each signature verifies, the operating system 32 likewise verifies and is deemed trustworthy, and the process proceeds. If not, the operating system 32 is deemed not trustworthy and the process halts. Assuming that each signature verifies and the process proceeds, the trusted component 18 next examines the driver table 40 in the ROM 34 to locate the HWID driver 42 (step 605), verifies the signature of the HWID driver 42 (if present) with (PU-OEM) (step 607), and determines whether the HWID driver 42 contains a pointer back to an address inside of the kernel 38 (step 609).

If the HWID driver 42 verifies and contains a pointer back to an address inside of the kernel 38, it can be presumed that the HWID driver will appropriately obtain the secure HWID from the HWID component 30 and return same to the kernel 38, such HWID driver 42 is deemed trustworthy, and the process proceeds. If not, the HWID driver 42 is deemed not trustworthy and the process halts. Assuming that the HWID driver 42 is deemed trustworthy, the trusted component 18 then presumes that the operating system 32 is to be trusted and in fact calls to the operating system 32 with the kernel 38, the driver table 40 and the HWID driver 42 to obtain the secure HWID from the HWID component 30 and return same to the trusted component 18 (step 611). As should be appreciated, the call is to the kernel 38, and the kernel 38 transparently re-directs the call to the HWID driver 42 with the aid of the driver table 40, receives the returned secure HWID, from the HWID driver 42, and forwards same to the trusted component 18.

With the secure HWID, the trusted component 18 then proceeds to perform whatever task is required concerning the secure HWID, including verifying that the trusted component 18 is in fact on the correct device 14 (step 613). Thus, if a license 16 is bound to the trusted component 18 (by for example including a content key (CK) encrypted according to (PU-HW), such license is by extension bound to the device 14 having the secure HWID.

CONCLUSION

Although the present invention is especially useful in connection with a device 14 with limited ability to generate a secure HWID on its own, the present invention may be practiced with regard to any appropriate device, all without departing from the spirit and scope of the present invention, such as for example a personal computer, a server, an intelligent appliance, etc. Accordingly, the device 14 is to be interpreted to encompass any appropriate device requiring a secure HWID.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method and mechanism that imparts a secure HWID to a device 14 in for example the case where the hardware is not trusted to provide a secure HWID. The imparted secure HWID can be obtained by the operating system 32 of the device 14 by way of a HWID component 30 as provided by a manufacturer of the device 14, and the HWID component 30 is trusted to impart a secure HWID to the device 14 and to divulge such secure HWID to the operating system of such device 14, where the secure HWID cannot easily be changed or misrepresented by a nefarious entity. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A method of manufacturing a computing device for receiving a piece of digital content and a digital license therefor and for rendering the content in accordance with the license, the method being performed to ensure that the device can access a secure hardware identifier (HWID) thereon, the license being bound to the secure HWID such that the license is inoperative on another device having a different secure HWID, the method comprising:

receiving from a certifying authority a public key (PU-OEM) with a signature from the certifying authority;

placing the (PU-OEM) with the signature in a memory of the device;

receiving an operating system for the device, the operating system having multiple individual components including an executable kernel, a plurality of drivers, and a driver table with a pointer to each driver, each individual component being accompanied by a signature derived from the component;

supplying the device with a HWID component for obtaining the secure HWID from the device and forwarding the secure HWID to the operating system of the device upon the operating system requesting the secure HWID;

placing a HWID driver in the memory as an addition to the operating system, the HWID driver communicating with the HWID component to obtain and forward the secure HWID to the operating system, upon the operating system requesting the secure HWID;

placing a reference to the HWID driver in the driver table; and for each signed component of the operating system:

verify the signature of the component;

removing the verified signature; and signing the component with a private key (PR-OEM) corresponding to the (PU-OEM); and placing the components of the operating system, including the components with the (PR-OEM) signatures, into the memory, whereby a trusted component obtained for the device from a trusted component authority and constructed to include the secure HWID therein in a secure manner is verified by obtaining the (PU-OEM) with the signature thereof and verifying the signature, verifying each signed component of the operating system by verifying the signature thereof with the obtained (PU-OEM), examining the driver table to locate the HWID driver, and verifying that the HWID driver contains a pointer back to an address inside the kernel, and if the HWID driver and the operating system verify, calling the operating system to obtain the secure HWID from the HWID component and returning the secure HWID to the HWID driver by way of the driver table, the HWID driver obtaining the secure HWID by way of the HWID component and returning the secure HWID to the trusted component, and verifying that the returned secure HWID matches the secure HWID included in the trusted component.

2. The method of claim 1 wherein the HWID component is one of a piece of software and hardware.

3. The method of claim 1 wherein the HWID component retrieves the secure HWID from one of internally and externally with respect to such HWID component.

4. The method of claim 1 further comprising signing the HWID driver with (PR-OEM) and placing the signature of the HWID driver in the memory.

5. The method of claim 1 comprising placing (PU-OEM) with the signature in an image to be imparted to a memory of the device, placing the HWID driver in the image as an addition to the operating system, and placing the components of the operating system in the image, the method further comprising imparting the image to the memory of the device.

6. The method of claim 5 wherein the image to be imparted to a memory of the device is a ROM image to be imparted to a ROM memory of the device, the method comprising imparting the ROM image to the ROM memory of the device.

7. The method of claim 1 comprising, for each signed component of the operating system, signing the component with (PR-OEM) based on the component and a base address and length of the component in the image to result in ((file, start, length) S (PR-OEM)).

8. The method of claim 1 further comprising obtaining a trusted component for the device from a trusted component authority by:

accessing the secure HWID from the device;

providing the accessed HWID to the authority as part of a request for the trusted component for the device, the authority constructing the trusted component to include the provided HWID therein, and also to include therein a public-private key pair to be associated with the device (PU-HW, PR-HW), HWID and (PR-HW) being embedded in the trusted component in a secure manner;

receiving the trusted component with HWID, (PU-HW), and (PR-HW);

placing the received trusted component in a memory of the device.

9. The method of claim 8 wherein the trusted component may be updated on occasion, and wherein the memory having the trusted component is a non-volatile re-writable memory.

10. A computing device for receiving a piece of digital content and a digital license therefor and for rendering the content in accordance with the license, the the device having an accessible secure hardware identifier (HWID) thereon, the license being bound to the secure HWID such that the license is inoperative on another device having a different secure HWID, the device comprising:

a public key (PU-OEM) from a certifying authority with a signature from the certifying authority;

an operating system having multiple individual components including an executable kernel, a plurality of drivers, and a driver table with a pointer to each driver, each individual component being accompanied by a signature derived from the component and signed by a private key (PR-OEM) corresponding to the (PU-OEM);

a HWID component for obtaining the secure HWID from the device and forwarding the secure HWID to the operating system of the device upon the operating system requesting the secure HWID;

a HWID driver as an addition to the operating system, the HWID driver communicating with the HWID component to obtain and forward the secure HWID to the operating system, upon the operating system requesting the secure HWID; the driver table having a reference to the HWID driver therein, whereby a trusted component obtained for the device from a trusted component authority and constructed to include the secure HWID therein in a secure manner is verified by obtaining the (PU-OEM) with the signature thereof and verifying the signature, verifying each signed component of the operating system by verifying the signature thereof with the obtained (PU-OEM), examining the driver table to locate the HWID driver, and verifying that the HWID driver contains a pointer back to an address inside the kernel, and if the HWID driver and the operating system verify, calling the operating system to obtain the secure HWID from the HWID component and returning the secure HWID to the HWID driver by way of the driver table, the HWID driver obtaining the secure HWID by way of the HWID component and returning the secure HWID to the trusted component, and verifying that the returned secure HWID matches the secure HWID included in the trusted component.

11. The device of claim 10 wherein the HWID component is one of a piece of software and hardware.

12. The device of claim 10 wherein the HWID component retrieves the secure HWID from one of internally and externally with respect to such HWID component.

13. The device of claim 10 further comprising a signature for the HWID driver signed by (PR-OEM).

14. The device of claim 10 comprising (PU-OEM) with the signature and the components of the operating system including the HWID driver in a ROM memory of the device.

15. The device of claim 10 wherein each signed component of the operating system is signed with (PR-OEM) based on the component and a base address and length of the component to result in ((file, start, length) S (PR-OEM)).

16. The device of claim 10 further comprising a trusted component obtained for the device from a trusted component authority, the trusted component constructed to include the secure HWID therein, and also to include therein a public-private key pair to be associated with the device (PU-HW, PR-HW), HWID and (PR-HW) being embedded in the trusted component in a secure manner.

17. The method of claim 16 wherein the trusted component may be updated on occasion and is stored in a non-volatile re-writable memory.

* * * * *